May 9, 1950     R. DUUS     2,506,584
NAVIGATIONAL PLOTTING DEVICE
Filed May 22, 1946     2 Sheets-Sheet 1
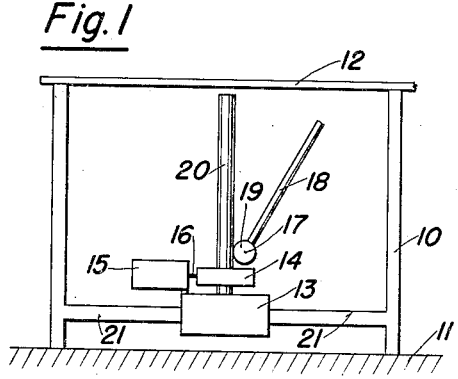
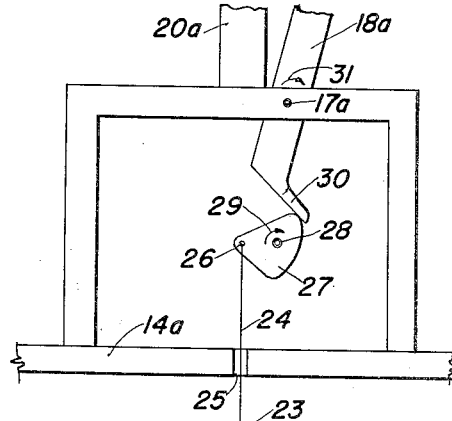
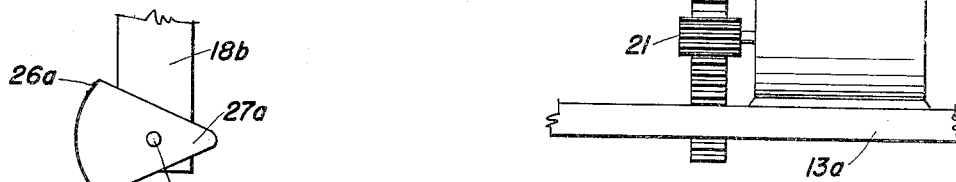
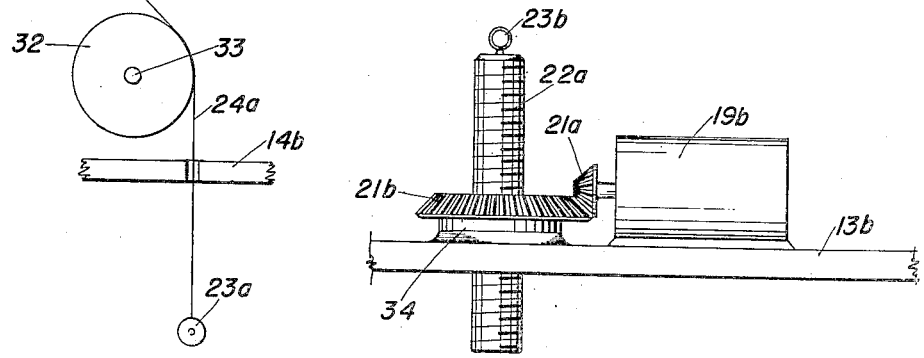
INVENTOR.
RAY DUUS
BY
*M. O. Hages*
ATTORNEY May 9, 1950 R. DUUS 2,506,584
NAVIGATIONAL PLOTTING DEVICE
Filed May 22, 1946 2 Sheets-Sheet 2

INVENTOR.
RAY DUUS
BY
M. O. Hayes
ATTORNEY

Patented May 9, 1950

2,506,584

UNITED STATES PATENT OFFICE 2,506,584

NAVIGATIONAL PLOTTING DEVICE

Ray Duus, United States Navy, Beverly Hills, Calif.

Application May 22, 1946, Serial No. 671,485

3 Claims. (Cl. 33—1)

(Granted under the act of March 3, 1883, as amended April 30, 1928; 370 O. G. 757)

This invention relates to plotting apparatus, and more particularly to navigational plotting apparatus for use in charting positions of objects surrounding a ship or shore station over successive discrete time intervals.

With increasing use of radiant energy detecting equipment, commonly known as radar, and associated devices, it is desirable to have a means for showing, not only the present location of objects surrounding a ship, but to also have means whereby the location of such surrounding objects in the period immediately preceding any present moment may be traced. While this invention is quite suitable for use in conjunction with radar equipment it is not necessarily so limited, it being understood that information plotted may be received from any source reporting the position of objects surrounding a ship.

Accordingly, it is an object of this invention to provide means whereby positions of objects surrounding a predetermined point may be plotted.

It is another object to provide means whereby temporal changes in the position of objects surrounding a predetermined point may be plotted quickly and easily.

It is another object to provide apparatus effective to produce, on a substantially plane surface, a spot of light corresponding to an object spaced from a predetermined point, which spot of light may be moved quickly and easily to other positions corresponding to other objects.

In accomplishing these and other objects of the present invention, I have provided improved details of structure, the preferred forms of which are illustrated in the accompanying drawings, wherein:

Fig. 1 shows an elevation of apparatus embodying this invention;

Fig. 2 is a detailed view of one embodiment of a particular portion of the apparatus shown completely in Fig. 1;

Figs. 3 and 4 illustrate alternative apparatus for accomplishing the same function performed by the structure shown in Fig. 2;

Figure 5:
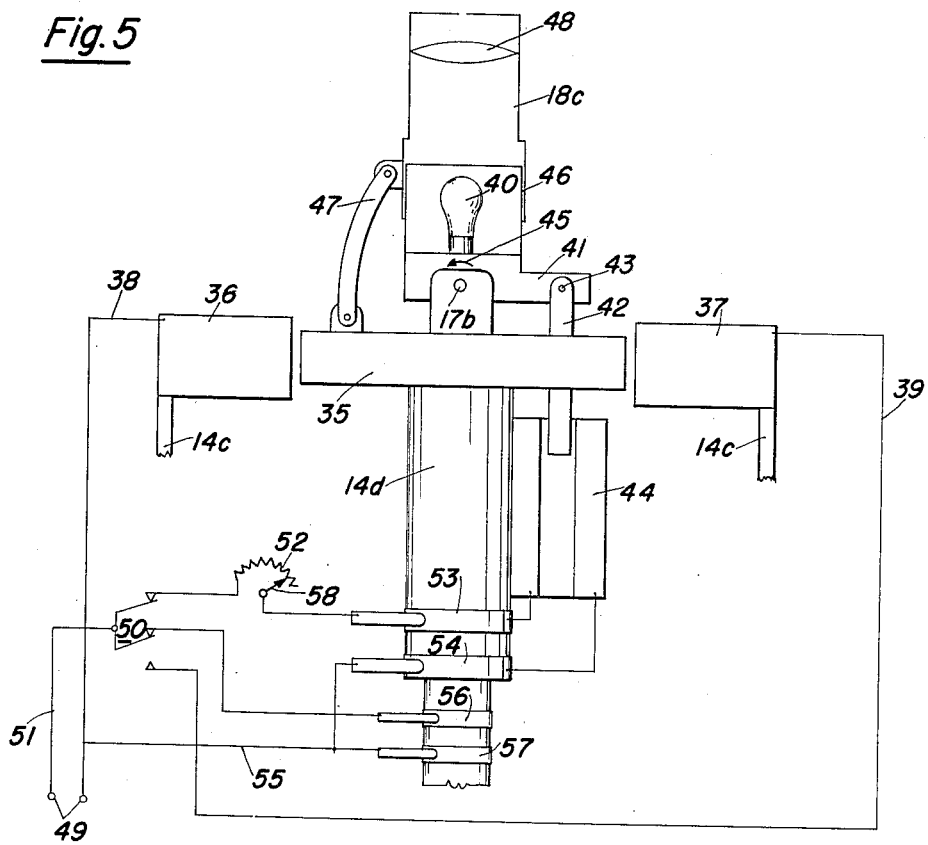
Fig. 5 is a further embodiment of apparatus which may be alternatively incorporated in the structure shown generally in Fig. 1.

The apparatus of this invention consists generally of a plotting table having a translucent top, beneath which and spaced appreciably therefrom, is means for generating a beam of light. The light generating means is so arranged that by tilting and rotating, the beam of light may be directed to any point on the undersurface of the translucent table top. In this way, objects surrounding one's own ship, represented by a point on the table top directly over the light generating means, may be momentarily indicated and plotted, for example, with crayon or other means for making an easily removable mark.

Referring more specifically to the drawings, the general form of the apparatus embodying this invention is shown in Fig. 1, wherein 10 represents a plotting table mounted on a deck 11 of a ship. Table 10 has a circular top 12, preferably of translucent material and circular in form. A base 13 spaced from table top 12 has rotatably mounted thereon a carrier 14. Motive means in the form of motor 15, mounted on base 13, is provided for rotating carrier 14 with respect to base 13 about an axis normal to table top 12. The operative connection between motor 15 and carrier 14 is shown schematically at 16.

Pivotally mounted on carrier 14 about an axis 17 is a light tube 18. Means, such as a reversible motor 19, are mounted on carrier 14 for rotating light 18 about axis 17.

A second light tube 20 may be provided, directed upward along the rotational axis of carrier 14.

If desired, base 13 may be movably mounted on cross members 21. In certain cases it may be desirable to employ as base 13 the movable carriage of a conventional "dead reckoning tracer." As is well known in the art, a dead reckoning tracer comprises a carriage movable along two perpendicular axes in accordance with navigational information fed to the dead reckoning tracer. Tracing means such as a light beam are provided on the carriage, so that the calculated position of the ship, controlled by the motion transmitted to the carriage, may be continuously indicated on a map-marked surface.

The application of the present invention to such a dead reckoning tracer will be readily evident by understanding that base 13 of the present invention may consist of the above mentioned carriage of the dead reckoning tracer movable in a plane parallel to deck 11 along mounting members 21.

It is not necessary in the practice of this invention to movably mount base 13; if desired, it may be fixedly mounted with respect to table top 12.

In the embodiment shown in Fig. 1, motors 15 and 19 are preferably tele-motors, or other devices effective to assume a predetermined angular position in accordance with electrical control signals fed thereto. Such devices are marketed under the names Selsyn, Synchro, Teletorque, and similar names. It will be understood that energy for motor 19, mounted on rotatable carrier 14, is fed thereto through suitable slip ring arrangements, not shown, as is energy for the lamps necessarily required inside light tubes 18 and 20.

Light tubes 18 and 20 may, if desired, be replaced by any means for producing a narrow angle, directable beam of light.

Fig. 2 shows an alternative means for transmitting tilting position to light tube 18, represented in Fig. 2 by the reference numeral 18a. Carrier floor 14a of Fig. 2, corresponding to carrier 14 in Fig. 1, is rotatable about the axis of tube 20a, being supported and rotated by any suitable means not shown. It will be understood that such means are similar to the means shown generally in Fig. 1 for the correspondingly referenced elements. Positioning motor 19a, effective to determine the tilting angle of light tube 18a, is mounted on base 13a, instead of being mounted on carrier 14a, as with the corresponding motor 19 in Fig. 1.

Motor 19a rotates a pinion 21, meshing with a rack 22 slidably mounted in base 13a. At the top of rack 22 is attached a swivel member in the form of ring 23 pivoted about a vertical axis as shown. Attached to, and extending upward from, ring 23 is a wire 24 passing through opening 25 in carrier 14a, and attached at its upper end 26 to one side of a cam 27. Cam 27 is pivoted on carrier 14a at 28 and biased clockwise by any suitable means as shown by arrow 29.

The surface of cam 27 cooperates with a toe 30 attached to light tube 18a, which is pivoted about axis 17a. Suitable means are provided for biasing light tube 18a clockwise as represented by the arrow 31.

The operation of the light tilting apparatus shown in Fig. 2 will be readily evident by visualizing that as motor 19a rotates pinion 21, rack 22 is pulled down. This causes counterclockwise rotation of cam 27 about axis 28, allowing toe 30 to move inwardly about axis 17a by the action of biasing means 31, thus tilting light tube 18a to the desired angle. At the same time, carrier 14a may be freely rotated about its axis (coinciding with wire 24) through the swiveling action of ring 23 in the top of rack 22. It is thus seen that two completely independent motions may be imparted to light tube 18a. Rotation of the tube is effected by rotation of carrier 14a, while tilting of the tube is effected by reciprocation of rack 22.

An alternative means for transmitting the reciprocation of rack 22 into rotation of light tube 18a is illustrated in Fig. 3. Ring 23a, corresponding to ring 23 in Fig. 2, has attached to it a wire 24a, the upper end of which is attached at 26a to the surface of a disk sector 27a rotatable about axis 28a on carrier 14b. The lower portion of wire 24a, i. e., the portion between ring 23a and carrier 14b must coincide with the rotational mounting axis of carrier 14b. If it is desired to offset the effective line of operation of wire 24a, a suitable idler pulley 32, pivotally mounted at 33 to carrier 14b, may be provided. Light tube 18b is fixedly mounted with respect to sector 27a, and like the latter is rotatable about axis 28a.

An alternative means for vertically reciprocating of wire 24 in Fig. 2 is shown in Fig. 4. Mounted on base 13b is a motor 19b having a pinion 21a attached thereto. Pinion 21a drives gear 21b, freely rotatable on a boss 34 of base 13b. Gear 21b is internally threaded and coacts with the external threads of a lead screw 22a having swivel pin 23b pivotally mounted at the top thereof.

The operation of the modified apparatus shown in Fig. 4 will be readily evident by referring to the correspondingly numbered elements of Fig. 2. Rotation of pinion 21a causes gear 21b to rotate, thereby reciprocating lead screw 22a through the action of the threads thereon. It will be understood that lead screw 22a is restrained from rotating, as by means of keying in base 13b.

A somewhat different form of light beam generator than described before is illustrated in Fig. 5, wherein 14c, corresponding to carrier member 14 in Fig. 1, is rotatably mounted about a vertical axis and is rotated by some means similar to motor 15 of Fig. 1. The actual light carrying apparatus is mounted on a separate carrier member 14d, which includes a horizontal, transverse, magnetized member 35. Carrier 14c includes electro-magnets 36 and 37, energized through wires 38 and 39. Carrier 14d is, like 14c, rotatably mounted on base 13 about the same vertical mounting axis as carrier 14c. Carrier 14d is freely rotatable, being rotated by magnetic attraction on the base 13 into a position such that magnet 35 is aligned with electro-magnets 36 and 37 whenever the latter are energized.

Pivotally mounted at 17b on carrier 14d is a light tube 18c, having at the bottom thereof an electric light 40. It will be understood that a light similar to light 40 is included in the aforementioned light tube 18, the showing thereof being omitted in this former instance in the interest of simplicity. Light tube 18c includes at its lower extremity a toe 41 fixedly attached thereto, at the end of which is pivoted at 43 a solenoid plunger 42. Plunger 42 reciprocates within a solenoid 44, attached at one side of carrier 14d. Suitable means biasing light tube 18c counter-clockwise about axis 17b are represented by arrow 45.

The manner in which light tube 18c may be directed toward any given point on table top 12 will now be reviewed. The radial displacement of the light spot appearing on top 12 is determined by the magnitude of the force exerted by solenoid 44 on plunger 42, acting against biasing means 45. This force in turn depends on the magnitude of the current in solenoid 44. The angular position of the light spot about the vertical axis of carrier 14d, at the radius determined by the magnitude of the energizing current in solenoid 44, is determined by the position of electro-magnets 36 and 37, mounted on carrier 14c. In practice, carrier 14c is rotated on base 13 to a desired angular position, or azimuth, by suitable means such as motor 15. Upon energization of magnets 36 and 37, magnetic armature 35 assumes a position in line with magnets 36 and 37, thereby disposing carrier 14d at the desired azimuth.

Light tube 18c is telescoped as shown at 46, and focusing means in the form of arm 47 are provided; rotation of light tube 18c about axis 17b causes arm 47 to shorten the focus of lens 48, thereby focusing the light spot at a greater distance. This provision is made to compensate for the fact that as light tube 18c is tilted outward the beam must focus on top 12 at an increasing distance.

The energizing circuit for the apparatus of Fig. 5 is shown comprising a source of voltage 49, one side of which is connected to a double pole, double throw switch 50, normally biased upwardly. Energy for solenoid 44 traverses connection 51, switch 50, variable resistor 52, slip ring 53 and returns through slip ring 54 and connections 55 to the other side of energy source 49. Energy for electro-magnets 36 and 37 is provided through connection 38, electro-magnet 36, electro-magnet 37, connection 39, switch 50 (when pressed closed) and connection 51.

Energy for light 40 is provided through connection 51, switch 50, slip ring 56 and returns through slip ring 57 to connection 55.

Arm 58 of variable resistor 52 is connected to a range determining means, so that the position of arm 58 is a uni-valued function of the range, or distance from the center point, at which it is desired to have the light spot appear. Thus, with switch 50 in the position shown, solenoid 44 is energized with a current proportional to the desired range thereby tilting light tube 18c a proportionate amount.

When it is desired to move the spot of light on top 12 to designate another plotting point, carrier 14c is first rotated by motor 15 to the desired azimuth. Switch 50 is then depressed, energizing electro-magnets 36 and 37 which rotate 14d to the desired angular position. Upon release of switch 50, carrier 14d remains as placed, and light 40 is energized simultaneously with solenoid 44 to cause the light spot to appear at the proper range. With each appearance of the light spot, a dot may be marked on table top 12 to plot the indicated position of the object.

This form of the invention does not carry a vertical tube like the tube 20, and hence is best suited for plotting from a stationary point such as a ground radar station.

Figure 6:
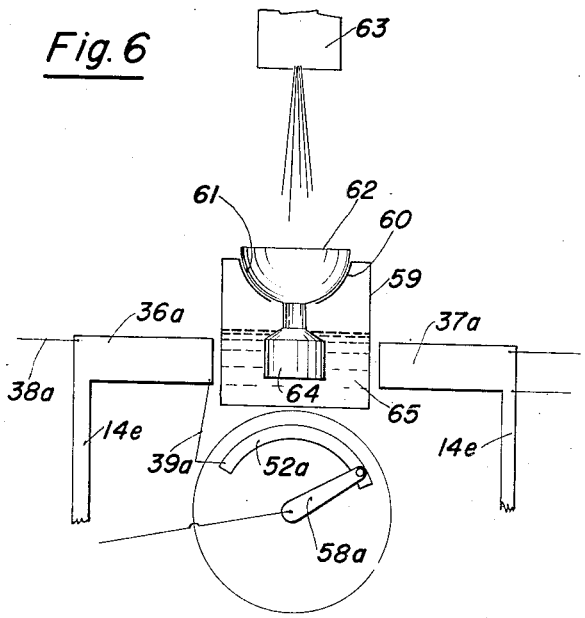
Fig. 6 illustrates an additional alternative structure which may be utilized in the apparatus shown generally in Fig. 1.

In Fig. 6 is illustrated a still further alternative light generator for use with polar plotting table 10. Numeral 14e represents a rotatable carrier of the general form shown at 14 and illustrated more specifically at 14c in Fig. 5. Like 14c, carrier 14e includes a pair of electro-magnets 36a and 37a diametrically disposed around the vertical axis.

Arranged on the axis between electro-magnets 36a and 37a is a container 59 fixedly mounted on base 13 and having at the top thereof a socket 60 into which may be fitted a ball 61. On the top of ball 61, which is preferably cut to a hemisphere, is mounted a mirror 62 upon which a beam of light may be directed from a source of light 63 directly overhead. Depending from ball 61 in socket 60 is a polarized magnetic member 64 constituting also a counterweight tending to return mirror 62 to a horizontal position. If desired, damping fluid 65 may be placed in container 59 to stabilize universal motion of member 64. Electro-magnet 37a is energized with a constant current. Electro-magnet 36a is energized, through variable resistor 52a corresponding to 52 in Fig. 5, with a current proportional to the range of the object to be plotted.

The operation of the modification shown in Fig. 6 is as follows:

Carrier 14e is angularly positioned in accordance with the azimuth of the object to be plotted. Arm 58a is positioned in accordance with the range of the object to be plotted. Upon energization of electro-magnet 36a through resistor 52a, magnet 64 will be drawn toward (or away from, depending upon the polarization of 36a and 64) magnet 36a, thereby determining the angular position of the light spot. The extent to which magnet 64 is pulled from its vertical position against the action of gravity is determined by the magnitude of the current in electro-magnet 36a. Thus carrier 14e determines not only the azimuth of the light spot, by its angular position; but also determines the range of the light spot, by the magnitude of the current in electro-magnet 36a.

Like the modification of Fig. 5, this form does not carry an upright tube 20, and hence is best suited for ground station use.

Operation

The general operation of the apparatus of Fig. 1 will now be briefly described, it being understood that each of the modifications described after Fig. 1 utilizes slightly different operation steps, as already described. Dead reckoned information is fed to base 13 continuously, thereby causing the light beam from light tube 20 to form a spot continuously reporting the instantaneous position of "own ship." Range and azimuth information regarding an external object such as another ship is transmitted to motors 19 and 15, respectively, causing the light beam to be directed upon top 12 at a point corresponding to the position of the other ship. This position having been marked on top 12, new range and bearing information is transmitted to motors 19 and 15 and another point plotted.

All objects of interest having been plotted, the above procedure is continually repeated, thereby indicating temporal changes in positions of surrounding objects. In this way a continuous check on the position and movement, either relative or absolute, of surrounding objects, may be maintained at all times.

While I have shown embodiments of my invention, it is susceptible to modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. Polar plotting apparatus comprising a substantially plane surface, a base spaced from said plane surface, a first carrier rotatably mounted on said base about an axis normal to said plane surface, a light tube pivoted on said first carrier about an axis transverse of said tube and parallel to said plane surface, a first generator of magnetic flux mounted on said first carrier, a second carrier rotatably mounted on said base coaxially with said first carrier and having a second generator of magnetic flux coacting magnetically with said first generator, means to selectively energize one of said generators, means to rotatably position said second carrier, a solenoid mounted on said first carrier having a plunger, means connecting said plunger and said tube to translate plunger movement to tube rotation, and variable voltage means effective to energize said solenoid.

2. Polar plotting apparatus comprising a base, a carrier rotatably mounted on said base, magnetic flux producing means on said carrier effective to produce a flux perpendicular to the rotative axis of said carrier, a magnetic sensitive member rotatably mounted on said base for rotation about said axis and rotatable into position corresponding to the angular position of said carrier, variable focus light beam means pivoted on said member about an axis perpendicular to said carrier axis, means for controlling the angular position of said light beam means on said member, and a focusing arm connected between said member and said light beam means effective to change the focus of said light beam means in accordance with the angular position thereof.

3. Polar plotting apparatus comprising a base, a carrier rotatably mounted on said base, magnetic flux producing means on said carrier effective to produce a flux perpendicular to the rotative axis of said carrier, a magnetic sensitive member rotatably mounted on said base for rotation about said axis and rotatable into position corresponding to the angular position of said carrier, light beam means pivoted on said member about an axis perpendicular to said carrier axis, means for controlling the angular position of said light beam means on said member, circuit means for energizing said flux producing means, circuit means for energizing said controlling means, circuit means for energizing said light beam means, and two-position switch means connected in said circuit means effective in one position to energize said controlling means and said light beam means, and effective in the other position to energize said flux producing means.

RAY DUUS.

REFERENCES CITED

The following references are of record in the file of this patent:

UNITED STATES PATENTS

| Number | Name | Date |
|---|---|---|
| 1,753,781 | Ford | Apr. 8, 1930 |
| 1,965,098 | Eaton | July 3, 1934 |
| 2,139,635 | House | Dec. 6, 1938 |
| 2,203,674 | Dashefsky | June 11, 1940 |
| 2,366,772 | Ebeling | Jan. 9, 1945 |
| 2,371,511 | Faus | Mar. 13, 1945 |

FOREIGN PATENTS

| Number | Country | Date |
|---|---|---|
| 692,678 | France | Aug. 5, 1930 |
| 819,835 | France | July 19, 1937 |